G. D. BUCK.
LUBRICANT INDICATOR FOR ENGINE CRANK CASES.
APPLICATION FILED OCT. 28, 1912.
1,068,626. Patented July 29, 1913.
Fig. I.
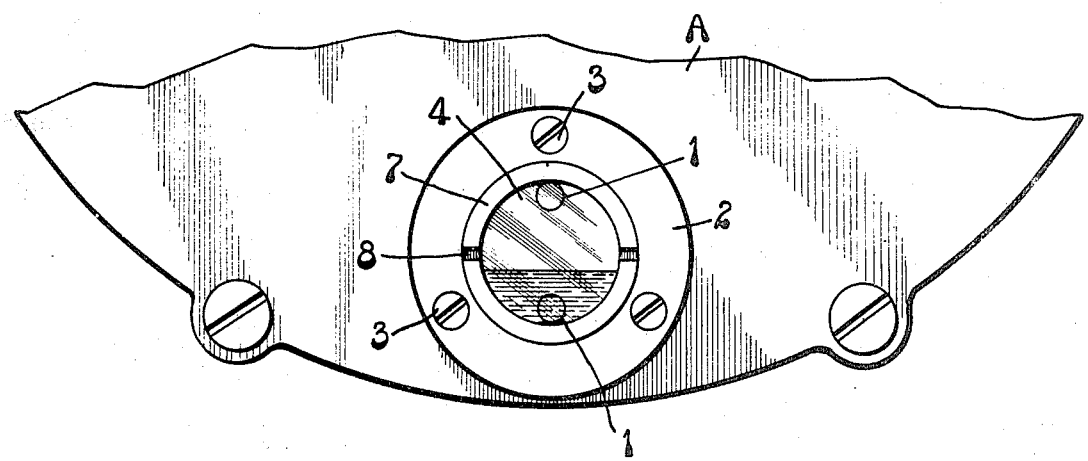
Fig. II.
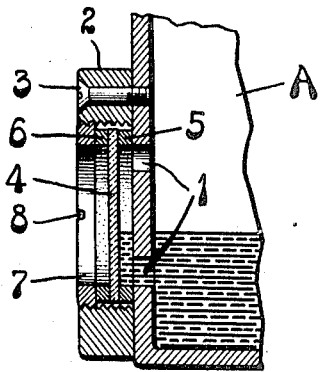
Attest
A. J. McCauley
E. B. Quinn
Inventor:
Geo. D. Buck
by Knight & Cook
Attys.

UNITED STATES PATENT OFFICE.

GEORGE D. BUCK, OF ST. LOUIS, MISSOURI.

LUBRICANT-INDICATOR FOR ENGINE-CRANK CASES.

1,068,626.  Specification of Letters Patent.  Patented July 29, 1913.

Application filed October 28, 1912. Serial No. 728,151.

*To all whom it may concern:*

Be it known that I, GEORGE D. BUCK, a citizen of the United States of America, and a resident of the city of St. Louis and State of Missouri, have invented certain new and useful Improvements in Lubricant-Indicators for Engine-Crank Cases, of which the following is a full, clear, and exact description, reference being had to the accompanying drawings, forming a part of this specification.

My invention relates to an indicator for showing the depth of oil in the crank case of the engine used in a motorcycle or automobile, the object being to produce an extremely simple, inexpensive and efficient indicator structure which may be readily applied to the crank case with which it is to be used.

Figure I is a side elevation of the lower portion of an engine crank case equipped with my lubricant indicator. Fig. II is a vertical section taken approximately through the center of the indicator.

In the accompanying drawings:—A designates an engine crank case, one of the side walls of which is provided with two perforations 1, located in different horizontal planes, the lower perforation serving as a port for admitting oil from the crank case to the well of the indicator, and the upper perforation serving as a vent from said well to the interior of the crank case. The indicator comprises a member provided with a sight opening, said member being preferably a ring 2 arranged around the perforations 1 and secured to the crank case by screws 3. A glass plate 4 closing the sight opening in the ring 2 is arranged within said ring and located between packing gaskets 5 and 6.

7 designates an externally screw threaded ring fitted to internal screw threads in the outer ring 2, and bearing against the gasket 6. The threaded ring 7 is preferably provided with notches 8 for the reception of a suitable tool by which it may be adjusted to compress the gaskets 5 and 6, thereby producing a tight joint between the gasket 5 and the wall of the crank case around the perforations 1, and at the same time firmly clamping the glass plate between said gaskets. The inner gasket 5 separates the glass plate 4 from the crank case so as to produce an oil well, the walls of said pocket being formed by the gasket 5, the glass plate 4 and the adjacent wall of the crank case A. It will be noted that the background of the sight opening is a portion of the crank case which may be cleaned from time to time upon the removal of the threaded ring 7 and glass plate 4.

The most salient feature of my present improvement resides in an indicator of the kind described having as essential elements thereof a crank case part in which there are perforations at different elevations, or in different horizontal planes, a transparent plate separated from such perforated part, and a well in which the transparent plate is included into which lubricant may enter the well by passing through a lower perforation in the perforated part, an upper perforation in such part furnishing an air vent between the well and the interior of the crank case. The advantage of this construction lies in the fact that it provides separation of the well from the interior of the crank case in a manner which permits of the lubricant entering readily into the well of the indicator to a level corresponding to the level of the lubricant in the crank case when the engine mechanism in the crank case is at rest, and without opportunity for the lubricant in the crank case being splashed against the transparent plate of the indicator when the engine mechanism is in operation. In this connection, it should be explained that when the engine mechanism is placed in operation, the lubricant is drawn by suction from the indicator through the lower inlet perforation 1 in the crank case wall, and there is absence of lubricant in the indicator well throughout the period of operation of the engine. When the operation of the engine is discontinued, the lubricant passes through the lower and inlet perforation 1 into the well of the indicator until it reaches a level therein corresponding to the level of the lubricant in the crank case; and as this occurs, the air in the indicator well is vented through the upper perforation 1 into the crank case, instead of remaining in the well to act as an air cushion that would prevent free entrance of the lubricant into the indicator well.

I claim:—

1. The combination with an engine crank case having a wall provided with perforations in different horizontal planes, of a sight member carried by said wall extending around said perforations, the said member having a sight opening, a transparent plate closing said opening, and means for separating said transparent plate from said crank case wall to produce a well in communication with the interior of said crank case through said perforations.

2. The combination with an engine crank case having a wall provided with perforations in different horizontal planes, of a well forming member jutting outwardly from said crank case wall and encircling said perforations, and a transparent plate in said well forming member spaced away from said crank case wall.

3. The combination with an engine crank case having a wall provided with perforations in different horizontal planes, of an internally threaded ring secured to said wall and arranged around said perforations, a transparent plate within said ring, a gasket separating said transparent plate from said perforated crank case wall to produce a well communicating with the interior of said crank case, and an externally threaded ring screwed into said internally threaded ring to firmly hold said transparent plate against said gasket.

4. A lubricant indicator for an engine crank case comprising a crank case part having perforations in different horizontal planes, a well member surrounding said perforations and extending laterally from the part provided with the perforations, and a transparent closure for said well member opposite and spaced from said perforated part.

GEO. D. BUCK.

In the presence of—
A. J. McCauley,
E. B. Linn.